March 15, 1927.

H. HANSON

HEATER FOR AUTOMOBILES

Filed Dec. 23, 1924

1,621,199

Inventor
Herman Hanson

By Bradbury & Carwell
Attorneys

Patented Mar. 15, 1927.

1,621,199

UNITED STATES PATENT OFFICE.

HERMAN HANSON, OF MINNEAPOLIS, MINNESOTA.

HEATER FOR AUTOMOBILES.

Application filed December 23, 1924. Serial No. 757,777.

My invention relates to an improved device for heating the cab of an automobile with heat derived from the exhaust of the engine.

An object of the invention is to provide a simple and effective device that may be built conveniently into an automobile structure at the factory or thereafter readily installed for use.

Another object of the invention is to supply a hot water heater, wherein a heater duct is associated with an exhaust duct of the automobile engine and, wherein, the usual elements of the water cooling system for the engine are employed for circulating and storage purposes.

With the foregoing and other objects in view, which will appear in the following description, the invention resides in the novel combination and arrangement of parts and in the details of construction hereinafter described and claimed.

Figure 1:
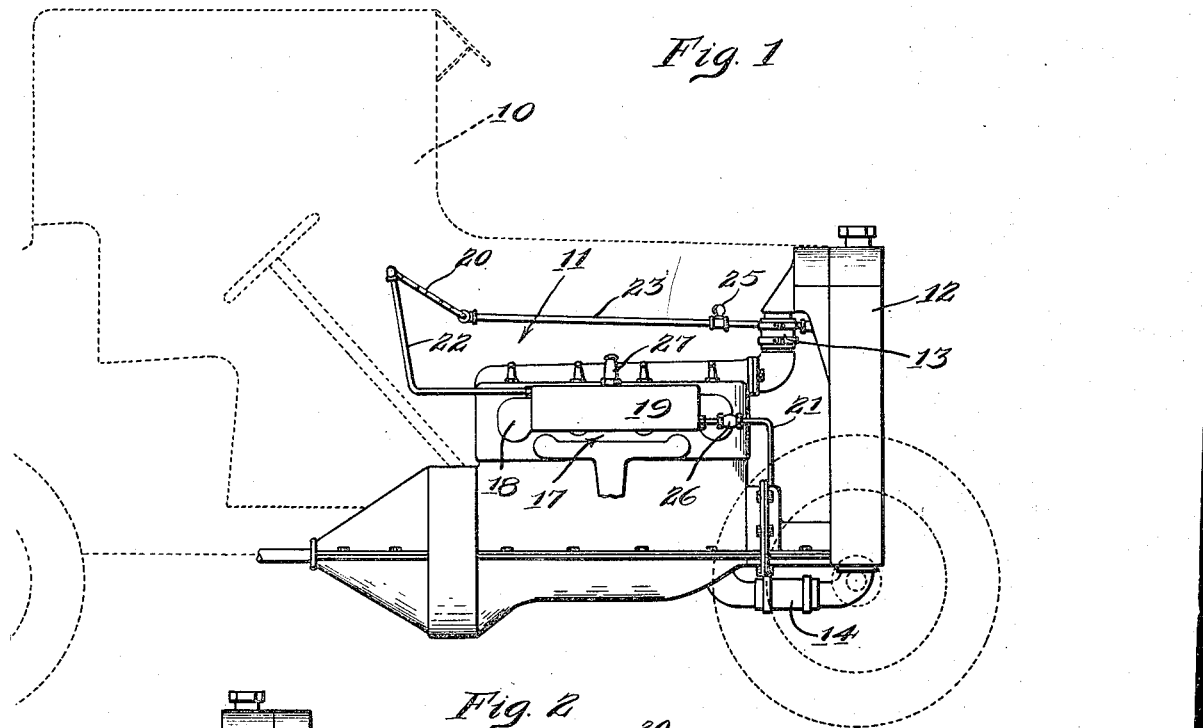
Figure 2:
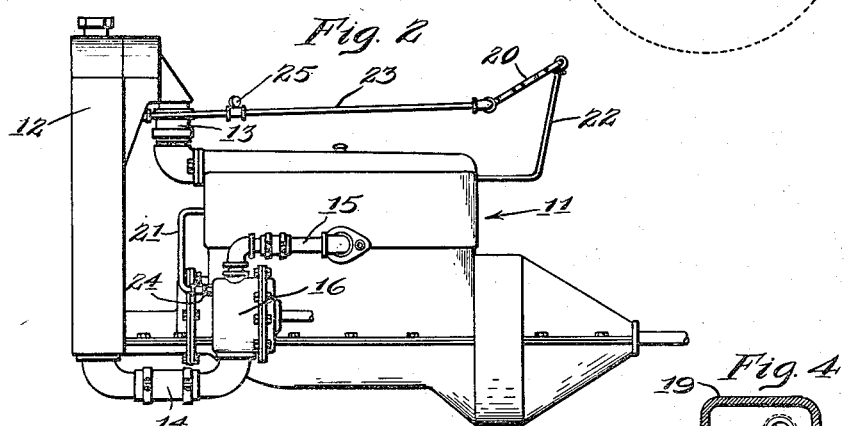
Figure 3:
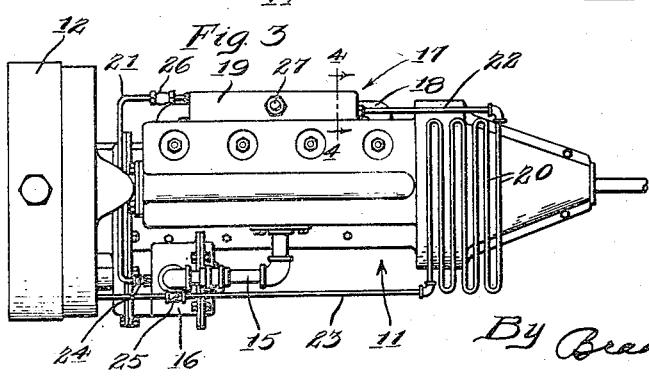
Figure 4:
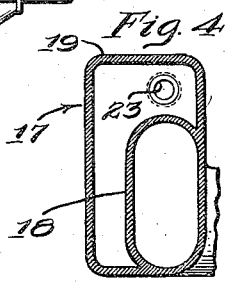

In the drawings, Fig. 1 is an elevational view illustrating an embodiment of my invention as applied to an automobile, the usual parts of the automobile being diagrammatically displayed, partly in dotted lines and partly in solid lines; Fig. 2 is an elevational view of the heater appearing in Fig. 1, the same being shown in connection with the engine illustrated in said Fig. 1; Fig. 3 is a plan view of the structure shown in Fig. 2; and Fig. 4 is a sectional view taken on the line 4—4 of Fig. 3, the same illustrating in detail the water jacket for the exhaust manifold of the engine.

Reference being had to the drawing it will be seen that the illustrated automobile includes the usual cab 10 and water jacketed internal combustion engine 11, also the usual cooling system comprising a water cooling reservoir 12, water connections 13, 14 and 15 and water pump 16 for circulating water from the reservoir 12 through the cylinder jackets of the engine 11 and back to said reservoir 12.

I have shown a heater duct 17 associated with that part of the exhaust duct 18 known as the exhaust manifold. In said disclosure, this heater duct 17 comprises a water chamber formed between the exhaust manifold 18 and a jacket 19 spaced from the upper and outer sides of said manifold. Inside of the cab 10 of the automobile and above the heater duct 17 is a radiator 20, the same consisting in the present instance of a pipe turned loop upon loop in an inclined plane. Taking off from the outlet side of the water pump 16 is a feed pipe 21 leading to the lower portion of the heater duct 17 at the forward end thereof. This pipe 21 divides the output of the pump 16 and directs a part of the water issuing therefrom into the heater duct 17. Leading from the rearward end of the heater duct 17, at its upper portion, is a supply pipe 22, the same being connected with the upper branch of the radiator 20. A return pipe 23 connects the lower portion of the radiator 20 with the upper portion of the reservoir 12 of the water cooling system. From the foregoing description, it will be understood that water is forced by the pump 16 from the cooling reservoir 12 into the heater duct 17. Moving through this duct the water is heated and thence passes to the radiator 20 from which the heat of the water is radiated into the cab 10. Leaving the radiator 20 under the influence of the pump 16, the cooled water returns through the pipe 23 to the reservoir 12. Thus it will be seen that the pump 16 of the usual water cooling system is employed as the water circulating medium in my heating device. Also, it will be understood that such usual system constitutes water storage for my device and that the reservoir 12, vented in the conventional manner, allows for the expansion of water in said device.

Noting the relative arrangement of the heater duct 17, radiator 20 and reservoir 12, I wish to call attention to the fact that the water level in the latter stands above the radiator 20, also that the radiator is positioned above the heater duct 17. Under said arrangement of said elements, a natural flow of water is induced, by gravity, in the heating device. This arrangement augments the action of the water propelling pump in a heater, as shown, and even permits of the omission of such a pump.

The feed pipe 21 is fitted with a valve 24, which is adapted not only to regulate the flow of water from the pump 16 to the heater duct 17, but also to entirely arrest the flow of water through said pipe 21 and thereby "cut-off" the heating device. Fitted in the return pipe 23 is a conventional control valve 25. Said valves 24 and 25 may be used singly or jointly in controlling the flow of water through their respective pipes 21, 23, the valve 24 serving to control the ingress of water to the heater duct 17 and radiator 20 and said valve 25 serving to control the egress of water from said heater duct 17 and radiator 20. Fitted in the feed pipe 21 is a check-valve 26 of conventional design. This check valve 26 is arranged to obstruct the backward flow of water from the heater duct 17 to the pump 16 under pressure built up in the former. Said check valve 26 prevents the damaging of the pump by back pressure and it also provides for the circulation of water in the device by resolving any pressure in the heater duct 17 into force tending to urge water therefrom into the radiator 20 and through the same to the reservoir 12. It, therefore, will be understood that a pump, while very effective, is not essential to operativeness of the device and that a water propelling force may be derived in the nature of pressure created in the heater duct 17. The circulation of water in the device by such internal pressure is augmented by gravitation, under an arrangement of parts, as shown, but will not be arrested under an altered arrangement, wherein circulation by gravity is interfered with by changes in elevation of the parts. To avoid excessive strains within the heater duct 17, supply pipe 22, radiator 20 and return pipe 23 and between the check-valve 26 and control valve 25, I provide the heater duct 17 with a conventional safety valve 27.

Changes in the specific form of my invention, as herein disclosed, may be made within the scope of what is claimed without departing from the spirit of my invention.

Having described my invention, what I claim as new and desire to protect by Letters Patent is:

1. The combination with an automobile driven by an internal combustion engine equipped with a water cooling system including a cooling reservoir, of an auxiliary heater associated with and heated by an exhaust duct of the engine at a position beneath the water level in said reservoir, a radiator in the cab of the automobile, a feed line leading from said reservoir to said auxiliary heater, a check valve in said feed line to prevent the return flow of water therethrough by pressure built up in said auxiliary heater, a supply pipe connecting the auxiliary heater with the radiator and a return pipe connecting said radiator with said reservoir.

2. In combination with the water cooling system of an internal combustion engine, a radiator, a feed pipe connecting said cooling system and radiator, a return pipe connecting said radiator and cooling system, an auxiliary heater positioned in said feed pipe and a check valve situated at the inlet of said heater for preventing back flow through said feed pipe.

3. In combination with the exhaust manifold and water cooling system of an internal combustion engine, a radiator, a feed pipe connecting said cooling system and radiator, a return pipe connecting said radiator and cooling system, a casing formed integral with said exhaust manifold and providing an auxiliary heater, said auxiliary heater being connected in said feed pipe, and a check valve situated at the inlet of said heater for preventing back flow through said feed pipe.

In testimony whereof, I have signed my name to this specification.

HERMAN HANSON.